US011336431B2

(12) United States Patent
Hwang

(10) Patent No.: US 11,336,431 B2
(45) Date of Patent: May 17, 2022

(54) VERIFICATION SYSTEM AND METHOD FOR COOPERATING WITH BLOCKCHAIN AND OFF-CHAIN DEVICES

(71) Applicant: International Trust Machines Corporation, New Taipei (TW)

(72) Inventor: Gwan-Hwan Hwang, New Taipei (TW)

(73) Assignee: International Trust Machines Corporation, New Taipei (TW)

(*) Notice: Subject to any disclaimer, the term of this patent is extended or adjusted under 35 U.S.C. 154(b) by 408 days.

(21) Appl. No.: 16/579,306

(22) Filed: Sep. 23, 2019

(65) Prior Publication Data

US 2020/0344042 A1 Oct. 29, 2020

(30) Foreign Application Priority Data

Apr. 24, 2019 (TW) .................................. 108114388

(51) Int. Cl.
*H04L 29/06* (2006.01)
*H04L 9/06* (2006.01)
*G06F 16/22* (2019.01)

(52) U.S. Cl.
CPC ........ *H04L 9/0637* (2013.01); *G06F 16/2246* (2019.01); *G06F 16/2255* (2019.01); *H04L 9/0643* (2013.01); *H04L 2209/38* (2013.01)

(58) Field of Classification Search
CPC ..... H04L 9/3236; H04L 9/0637; H04L 63/20; H04L 2209/38; G06F 16/2246

(Continued)

(56) References Cited

U.S. PATENT DOCUMENTS

| | | | |
|---|---|---|---|
| 2012/0143830 A1* | 6/2012 | Cormode | G06F 16/24568 707/687 |
| 2017/0364552 A1 | 12/2017 | Pattanaik et al. | |
| 2018/0101701 A1* | 4/2018 | Barinov | H04L 63/12 |
| 2018/0198626 A1 | 7/2018 | Kroonmaa et al. | |

OTHER PUBLICATIONS

Hwang Gwan-Hwan et al: "Efficient Real-Time Auditing and Proof of Violation for Cloud Storage Systems", 2016 IEEE 9th International Conference on Cloud Computing (Cloud), IEEE, Jun. 27, 2016 (Jun. 27, 2016), pp. 132-139, XP033047897, DOI: 10.1109/CLOUD.2016.0027; [retrieved on Jan. 17, 2017]; section 2; figure 4.

(Continued)

*Primary Examiner* — Longbit Chai
(74) *Attorney, Agent, or Firm* — ScienBiziP, P.C.

(57) ABSTRACT

A verification system and method for cooperating with a blockchain and off-chain devices is provided. The system includes a security protocol device, a blockchain device, and a database device. The security protocol device receives and integrates the record data into a binary tree according to a hash function. Hash values of the record data are stored in the leaf nodes. The blockchain device is at the blockchain and communicates with the security protocol device. The security protocol device transmits the root hash to the blockchain device. The database device communicates with the security protocol device in an off-chain manner. The security protocol device stores the binary tree to the database device. The security protocol device compares the root hash from the blockchain device with the root hash of the binary tree stored in the database device to verify the correctness of the binary tree stored in the database device.

21 Claims, 5 Drawing Sheets

(58) Field of Classification Search
USPC .......................................................... 380/40
See application file for complete search history.

(56) References Cited

OTHER PUBLICATIONS

Hwang Gwan-Hwan et al: "InfiniteChain: A Multi-chain Architecture with Distributed Auditing of Sidechains for Public Blockchains", Jun. 22, 2018 (Jun. 22, 2018), Annual International Conference on the Theory and Applications of Cryptographic Techniques, Eurocrypt 2018; [Lecture Notes in Computer Science; Letc. Notes Computer], Springer, Berlin, Heidelberg, pp. 47-60, XP047476573, ISBN: 978-3-642-17318-9; [retrieved on Jun. 22, 2018]; section 2; figures 3, 5.

Jamthagen, C. and Hell, M., Blockchain-based publishing layer for the Keyless Signing Infrastructure, UIC-AIC-ScalCom-CBDCom-IoP-SmartWorld 2016, Jul. 2016, pp. 374-381.

Garner, B., Merkle Tree Hashing: How Blockchain Verification Works, [online], Sep. 3, 2018.

Vaughan, W., Bukowski, J. and Wilkinson, S., Chainpoint A scalable protocol for anchoring data in the blockchain and generating blockchain receipts, [online], Jun. 29, 2016, v2.0.

Gipp, B., Meuschke, N. and Gernandt, A., Decentralized Trusted Timestamping using Crypto Currency Bitcoin, arXiv.org, [online], Feb. 13, 2015, arXiv:1502.04015, pp. 1-6.

Montgomery multiplication, Jul. 2, 2010 [search on Jan. 27, 2022].

* cited by examiner

VERIFICATION SYSTEM AND METHOD FOR COOPERATING WITH BLOCKCHAIN AND OFF-CHAIN DEVICES

CROSS-REFERENCE TO RELATED APPLICATION

This non-provisional application claims priority under 35 U.S.C. § 119(a) to Patent Application No. 108114388 filed in Taiwan, R.O.C. on Apr. 24, 2019, the entire contents of which are hereby incorporated by reference.

BACKGROUND

Technical Field

The present invention relates to a verification system, and in particular, to a verification system and method that can cooperate with a blockchain and off-chain device.

Related Art

In the prior art, a blockchain adopts a distributed architecture to achieve decentralization. Terminal computers of the world can be connected by blockchains. Data transmitted by any terminal computer to a blockchain can be distributed to other terminal computers on the blockchain through a specific operation mode. Since these data are stored in a large number of terminal computers on the blockchain, the correctness of the data can be mutually verified by the large number of terminal computers on the blockchain, which makes the blockchain data difficult to be altered or tampered with.

In the traditional terminal centralized architecture, when a terminal computer needs to upload data to a server or download data from a server, this task involves only the operation of limited devices such as the terminal computer, a central server, and a network server between the two. This task can be performed extremely quickly in terms of the current network speed and computer computing power. However, in the blockchain architecture, when a terminal computer needs to upload data to a blockchain or download data from a blockchain, based on the characteristics of the blockchain, this task involves verification procedures of a large number of other terminal computers (such as miners) on the blockchain. Consequently, huge network transmission requirements and operation amount are incurred, which is relatively time-consuming and high in operation costs (such as fees for miners).

Compared with the conventional public blockchain, there is a private blockchain at present, which is composed of a relatively small number of terminal computers, thereby reducing the network transmission requirements, operation amount, operation time, and operation costs. For example, a bank group can create a private blockchain for the internal organization within the group or its clients. However, a smaller number of terminal computers and privately-created features mean that the credibility (non-repudiation) of the private blockchain is not as good as that of the public blockchain, and the applicable scope of the private blockchain is also relatively narrower.

In general, a blockchain is a tree-like data structure that uses a binary tree or a Merkle tree. All data are hashed to generate hash values. The binary tree includes a root at the top layer and a plurality of leaf nodes at the bottom layer. A hash value of each datum is stored in the leaf node, and the hash values of all leaf nodes are layer-by-layer operated to generate a root hash at the root of the tree. All binary trees are stored in terminal computers on the blockchain. To verify the correctness of a datum in a binary tree, the correctness of the binary tree and the datum thereof can be verified by comparing root hashes of the binary tree on the terminal computers.

SUMMARY

Based on the prior blockchain, it is possible to verify that a certain data exists in a certain leaf node of a certain binary tree under a certain operation amount. For example, the leaf node and the corresponding one of another leaf node may be grouped for performing a layer-by-layer hash calculation until the root hash is calculated. If the root hash is correct, it means that the data does exist; however, it is difficult to verify that a certain data does not exist because it is necessary to obtain a complete binary tree, including the root hash and the hash values of all leaf nodes, to perform a complete operation to verify that the certain data does not exist in any of the leaf nodes of the binary tree. The network transmission requirements, operation amount, operation time, and operation costs are enormous.

In view of this, the present invention provides a verification system and method for cooperating with a blockchain and off-chain device, to alleviate the network transmission requirements, operation amount, operation time, and operation costs of the entire system under the premise of maintaining the credibility (non-repudiation) of the data.

An embodiment of the present invention provides a verification system that is suitable for cooperating with a blockchain and communicating with a plurality of terminal devices in an off-chain manner. Each of the terminal devices generates at least one record datum. The verification system comprises a security protocol device, a blockchain device, and a database device. The security protocol device receives the record data and integrates the record data into at least one binary tree according to a hash function. The binary tree comprises a root and a plurality of leaf nodes. The root stores a root hash, and hash values of the record data are respectively stored in the leaf nodes. The blockchain device is located at the blockchain and communicates with the security protocol device. The security protocol device transmits the root hash of the binary tree to the blockchain device. The database device communicates with the security protocol device in an off-chain manner not involved in the blockchain. The security protocol device stores the binary tree to the database device. Wherein, when the security protocol device receives a verification request, the security protocol device compares the root hash from the blockchain device with the root hash of the binary tree stored in the database device to verify the correctness of the binary tree stored in the database device.

An embodiment of the present invention provides a verification method that is suitable for cooperating with a blockchain and off-chain device. The verification method includes: receiving a plurality of record data from a plurality of terminal devices in an off-chain manner not involved in the blockchain; integrating the record data into at least one binary tree according to a hash function, wherein the binary tree comprises a root and a plurality of leaf nodes, the root stores a root hash, and hash values of the record data are respectively stored in the leaf nodes; transmitting the root hash of the binary tree to the blockchain; storing the binary tree in the off-chain manner not involved in the blockchain; and while receiving a verification request, comparing the root hash from the blockchain with the root hash of the binary tree stored in the off-chain manner to verify the correctness of the binary tree stored in the off-chain manner.

In summary, under the premise of maintaining the credibility (non-repudiation) of the data, most of the data can be set in the database device in the off-chain manner, and the root hash of the binary tree of the database in the off-chain manner is compared with the corresponding root hash on the blockchain by the security protocol device to verify the correctness of the binary tree, thereby converting the main operation to execution in the off-chain manner, which greatly reduces the load of the blockchain, such that the network transmission requirements, operation amount, operation time, and operation costs of the entire system are alleviated.

The detailed features and advantages of the present invention are described in detail below in the implementations. The content is sufficient for those skilled in the art to understand the technical content of the present invention and implement it accordingly. The related objectives and advantages of the present invention can be easily understood by those skilled in the art according to the content, the claims, and the drawings disclosed in the specification.

DETAILED DESCRIPTION

Figure 1:
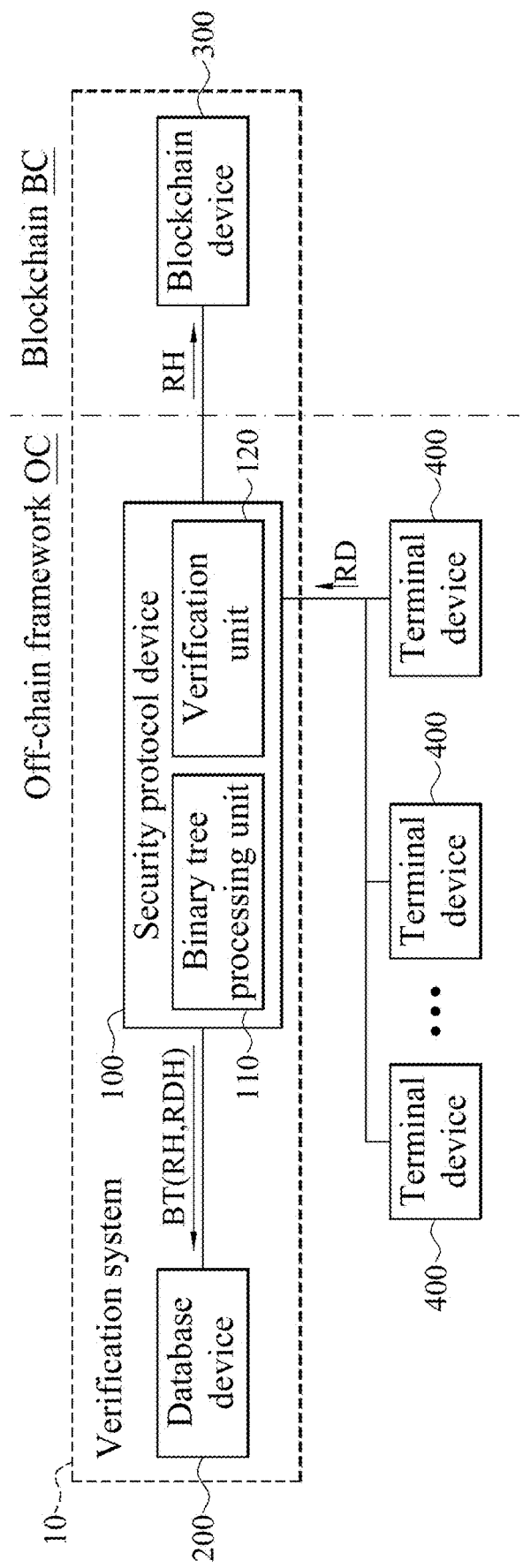
FIG. 1 is a schematic block diagram of a verification system according to an embodiment of the present invention.

Referring to FIG. 1, FIG. 1 is a schematic block diagram of a verification system 10 according to an embodiment of the present invention. In this embodiment, the verification system 10 is suitable for cooperating with a blockchain BC. The blockchain BC may include a public blockchain, a private blockchain, or a combination thereof. The verification system 10 is configured to communicate with a plurality of terminal devices 400 in an off-chain manner e.g. via an off-chain framework OC consisted of, for example, one or more off-chain devices and/or one or more off-chain channels not involved in the blockchain BC, and cooperates with the off-chain framework OC and the blockchain BC. Each terminal device 400 can generate at least one record data RD. The off-chain framework OC refers to a path that is independent of the blockchain BC. The off-chain framework OC communication refers to a communication relationship on a path independent of the blockchain BC. For example, communication between two devices via an off-chain framework OC means that the two devices can be directly connected and transmit signals to each other through networks without involving the blockchain BC. The terminal device 400 is, for example, a desktop computer, a notebook computer, or various sensors. The record data RD is, for example, a file or transaction information generated by a desktop computer or a notebook computer, or numerical information sensed by a sensor, but is not limited thereto.

As shown in FIG. 1, in this embodiment, the verification system 10 includes a security protocol device 100, a database device 200, and a blockchain device 300. The security protocol device 100 communicates with the database device 200 via the off-chain framework OC, and the security protocol device 100 communicates with the blockchain device 300 located on the blockchain BC. The database device 200 is, for example, a data storage server independent of the blockchain BC, and the blockchain device 300 is, for example, a collection of a plurality of computers connected to the blockchain BC, but is not limited thereto. In this embodiment, the security protocol device 100 is a server that combines communication capabilities of the blockchain BC and the off-chain framework OC. For example, the security protocol device 100 is an intermediary between the off-chain framework OC and the blockchain BC, and can serve as a bridge between the terminal device 400 and the database device 200 as well as the blockchain device 300, which will be detailed later.

Figure 2:
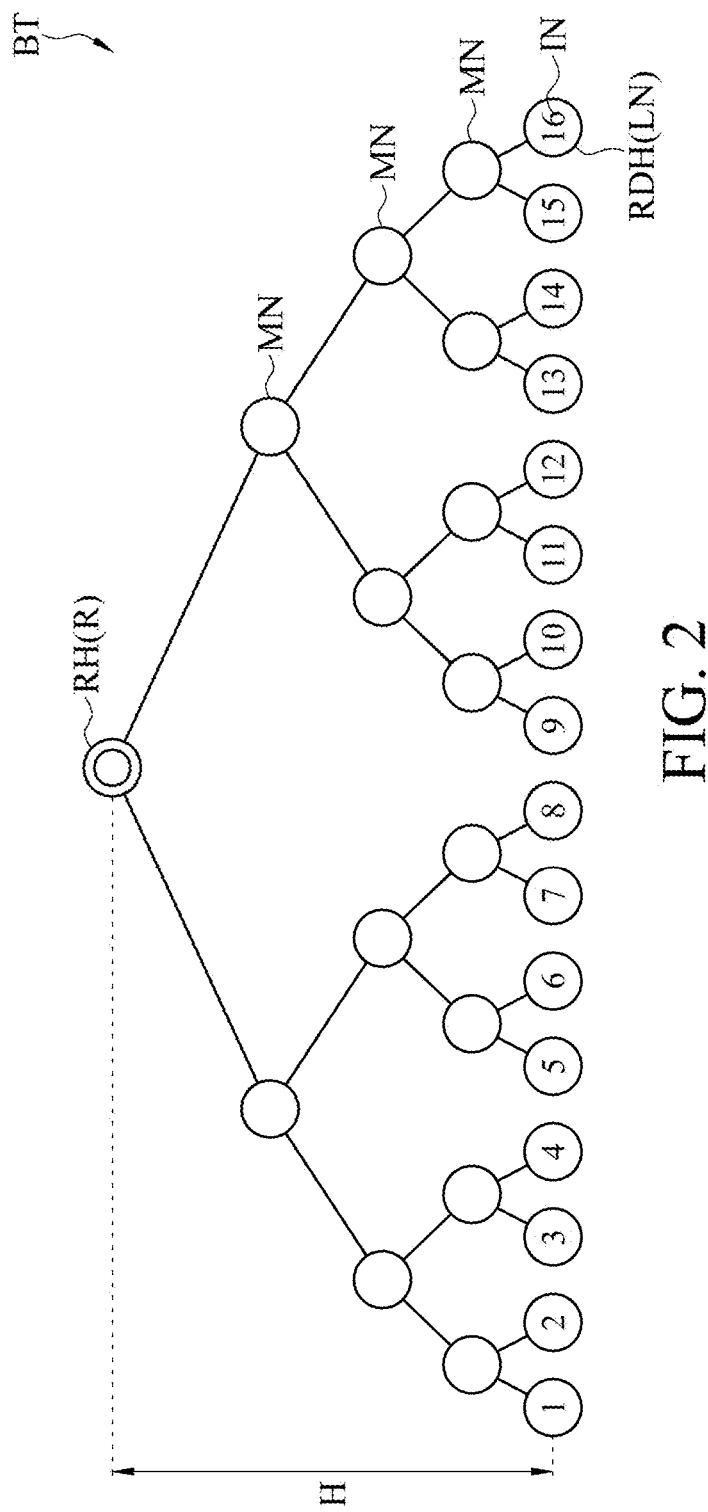
FIG. 2 is a schematic diagram of a binary tree according to an embodiment of the present invention.

Referring to FIG. 2, FIG. 2 is a schematic diagram of a binary tree BT according to an embodiment of the present invention. As shown in FIG. 1 and FIG. 2, in this embodiment, after each terminal device 400 generates the record data RD, each terminal device 400 transmits the record data RD to the security protocol device 100 via the off-chain framework OC. After the security protocol device 100 receives the record data RD of each terminal device 400 via the off-chain framework OC, the security protocol device 100 integrates the record data RD into at least one binary tree BT according to a hash function.

As shown in FIG. 2, in this embodiment, the binary tree BT includes a root R, a plurality of middle nodes MN, and a plurality of leaf nodes LN. In the tree data structure of the binary tree BT, the root R is located at the top layer, the leaf nodes LN are located at the bottom layer, and the middle nodes MN are distributed at one or more layers between the top layer and the bottom layer. Every two adjacent leaf nodes LN integrate at an upper layer and become a middle node MN. Every two adjacent middle nodes MN at each layer integrate at an upper layer and become a middle node MN. Two middle nodes MN at the topmost layer integrate and become the root R. Each leaf node LN stores the respective one of the hash values RDH of the record data RD. A hash value of each middle node MN and a root hash RH in the root R are related to the hash values RDH of the record data RD.

For example, the security protocol device 100 may use the SHA-256 hash function to hash the record data RD to generate corresponding hash values RDH, and the security protocol device 100 respectively stores the hash values RDH of the record data RD to the respective leaf nodes LN. Moreover, the two hash values stored in each set of two adjacent leaf nodes LN are connected and then hashed and stored in the middle node MN at the upper layer, the two hash values stored in each set of two adjacent middle nodes MN at each layer are connected and then hashed and stored in the middle node MN at the upper layer, and so on. In this embodiment, the two hash values may be connected and then hashed in a manner that the two hash values are first connected into a string of code and then the string of code is hashed, but not limited thereto. For example, if the first hash value is "xxx", and the second hash value is "ooo", the two hash values are first connected as a string of code of "xxxooo", and the string code "xxxooo" will be hashed again to generate a hash value. Finally, the two hash values stored in the two middle nodes MN at the topmost layer are connected and hashed to generate a root hash RH. In other words, the binary tree BT includes the hash values RDH of the record data RD stored in the leaf nodes LN and the root hash RH stored in the root R. Moreover, the record data RD cannot be tampered with. This is because as long as any record datum RD in the binary tree BT has been tampered with, the hash value RDH of the record datum RD will change. As long as the hash value RDH of the record datum RD of any leaf node LN changes, the root hash RH of the binary tree BT also changes accordingly. By judging whether the root hash RH changes, the correctness of the record data RD corresponding to the binary tree BT can be verified. In different embodiments, a single leaf node LN may also store the hash values RDH of two or more record data RD. In this case, the hash values RDH stored in the leaf node LN are values obtained by connecting and hashing the hash values RDH of two or more record data RD.

As shown in FIG. 1 and FIG. 2, in this embodiment, the security protocol device 100 includes a binary tree processing unit 110 and a verification unit 120. The binary tree processing unit 110 and the verification unit 120 are, for example but not limited to, functional modules formed by software/hardware to perform specific functions respectively. The binary tree processing unit 110 and the verification unit 120 may be independent modules or an integrated module.

In this embodiment, the binary tree processing unit 110 of the security protocol device 100 automatically hashes and integrates the received record data RD to generate a binary tree BT. The security protocol device 100 transmits the root hashes RH of the binary trees BT to the blockchain device 300, that is, these root hashes RH will be stored on the blockchain BC. In addition, the security protocol device 100 stores the binary trees BT in the database device 200. That is, the complete binary tree BT is stored via the off-chain framework OC, instead of being stored on the blockchain BC. In other embodiments, the complete binary tree BT may also be stored in the database device 200 and transmitted to the blockchain device 300.

In this embodiment, the verification unit 120 of the security protocol device 100 verifies the correctness of the binary tree BT stored in the database device 200. When the security protocol device 100 receives a verification request, and the verification request is to verify the correctness of a certain record datum RD, the verification unit 120 automatically compares the root hash RH of the binary tree BT corresponding to the record datum RD on the blockchain device 300 with the root hash RH of the binary tree BT corresponding to the record datum RD stored in the database device 200, so as to verify the correctness of the binary tree BT stored in the database device 200. If the root hash RH on the blockchain device 300 is consistent with the root hash RH of the binary tree BT stored in the database device 200, based on the characteristics of the blockchain BC, it indicates that the binary tree BT of the record datum RD stored in the database device 200 is correct.

Since the complete binary tree BT is located in the database device 200 via the off-chain framework OC, the access and operation of the hash values RDH of the record data RD are mainly performed via the off-chain framework OC, and the network transmission requirements, operation amount, operation time, and operation costs for this task which is traditionally performed on the blockchain BC can be saved. Moreover, the root hash RH of the binary tree BT in the database device 200 can be verified by comparing with the corresponding root hashes RH on the blockchain device 300, and the correctness of the data in the database device 200 via the off-chain framework OC can be ensured.

Figure 3:
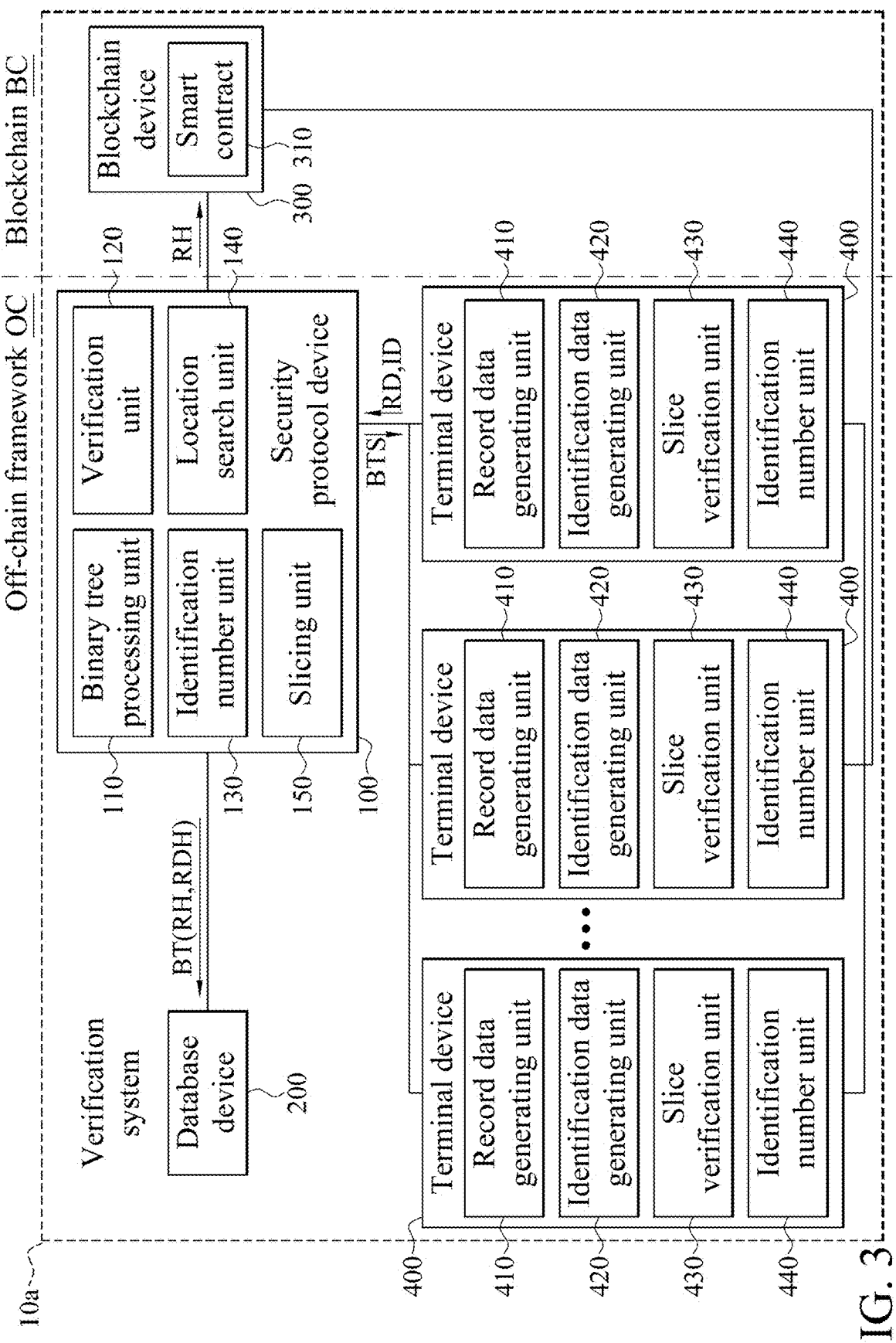
FIG. 3 is a block diagram of a verification system according to another embodiment of the present invention.

Referring to FIG. 3, FIG. 3 is a block diagram of a verification system 10a according to another embodiment of the present invention. The same or similar components, connection relationships, and functions of the verification systems 10 and 10a in FIG. 1 and FIG. 3 are not described again. The following describes the differences between the verification system 10a in FIG. 3 and the verification system 10 in FIG. 1. In the embodiment, the verification system 10a includes a security protocol device 100, a database device 200, a blockchain device 300, and a plurality of terminal devices 400. The security protocol device 100 communicates with the blockchain device 300 located at the blockchain BC, and communicates with the database device 200 and the terminal devices 400 via the off-chain framework OC. The terminal devices 400 further communicate with the blockchain device 300. The security protocol device 100 includes a binary tree processing unit 110, a verification unit 120, an identification number unit 130, a location search unit 140, and a slicing unit 150. The binary tree processing unit 110, the verification unit 120, the identification number unit 130, the location search unit 140, and the slicing unit 150 are, for example but not limited to, functional modules formed by software/hardware to perform specific functions respectively, and the binary tree processing unit 110, the verification unit 120, the identification number unit 130, the location search unit 140, and the slicing unit 150 may be independent modules or an integrated module.

As shown in FIG. 3, in this embodiment, the blockchain device 300 includes at least one smart contract 310, and the root hash RH transmitted by the security protocol device 100 to the blockchain device 300 is stored in the corresponding smart contract 310. In different embodiments, the blockchain device 300 can also include a program architecture or interface that is different from the smart contract, and the root hash RH can be stored in the blockchain device 300 corresponding to the different program architecture or interface.

As shown in FIG. 3, in this embodiment, each terminal device 400 includes a record data generating unit 410, an identification data generating unit 420, and a slice verification unit 430. The record data generating unit 410, the identification data generating unit 420, and the slice verification unit 430 are, for example but not limited to, functional modules formed by software/hardware to perform specific functions respectively. The record data generating unit 410, the identification data generating unit 420, and the slice verification unit 430 may be independent modules or an integrated module. The record data generating unit 410 is configured to generate the aforementioned record data RD. Moreover, when the record data generating unit 410 of each terminal device 400 generates the record data RD, the identification data generating unit 420 of each terminal device 400 also generates a plurality of identification data ID respectively corresponding to the record data RD, so that each of the record data RD has a corresponding identification data ID. The terminal device 400 transmits the record data RD and the corresponding identification data ID to the security protocol device 100 at the same time. In some embodiments, the terminal device 400 can integrate the record data RD and the corresponding identification data ID into integrated data and transmit the integrated data to the security protocol device 100. In some embodiments, the identification data ID is a plain code.

As shown in FIG. 3, in this embodiment, the security protocol device 100 receives the record data RD and the corresponding identification data ID, and the security protocol device 100 stores the hash values RDH of the record data RD to the corresponding leaf nodes LN according to the identification data ID. For example, after the security protocol device 100 receives the identification data ID, the identification number unit 130 of the security protocol device 100 generates a plurality of identification numbers IN respectively corresponding to the leaf nodes LN according to the identification data ID, and the security protocol device 100 stores the hash values RDH of the record data RD to the corresponding leaf nodes LN according to the identification numbers IN. In this case, each identification number IN is unique in any binary tree BT, and each of the identification numbers IN corresponds to the respective one of the leaf nodes LN in the binary tree BT. Therefore, the hash value RDH of each of the record data RD can be located at the respective one of the leaf nodes LN by using the corresponding identification number IN, which will be described in detail later.

In this embodiment, the identification number unit 130 of the security protocol device 100 extracts a plurality of predetermined bits from the hash value of the respective one of the identification data ID to generate the respective one of the identification numbers IN. Moreover, the number of the predetermined bits may be related to a height value H of the corresponding binary tree BT. When the binary tree BT has a height value H, the binary tree BT has $2^{(H-1)}$ leaf nodes LN. In order to enable the leaf nodes LN of the binary tree BT to have corresponding and exclusive unique identification numbers IN, the predetermined bits are at least H−1 bits extracted from the respective one of the hash values of the identification data ID. In this way, the arrangement of the H−1 bits will satisfy the number of the leaf nodes LN, so that the identification numbers IN corresponding to the leaf nodes LN are unique and not repeated. In this embodiment, the H−1 bits are, for example but not limited to, the first H−1 bits in the respective one of the hash values of the identification data ID. In other embodiments, the H−1 bits may be the last H−1 bits extracted from the respective one of the hash values of the identification data ID or H−1 bits in any location.

For example, the height value H of the binary tree BT of FIG. 2 is 5, and the binary tree BT has $2^{(5-1)}$ leaf nodes LN, that is, the binary tree BT has 16 leaf nodes LN. Assuming that identification data ID corresponding to a certain record datum RD is "E1534391", the identification number unit 130 hashes the identification data ID by using the SHA-256 hash function to generate a hash value "dbb9ed8b6774 68b4834d2f634a77ea1e6663431bf1ee7523041467ff8023fa 64". Next, the identification number unit 130 extracts the first four bits "1101" of the binary bit sequence converted by the hash value, and converts "1101" to the decimal value "13", thereby generating the identification number IN as "13". The identification number unit 130 may sequentially set all the 16 leaf nodes LN of the binary tree BT to the leaf nodes LN numbered 1 to 16, and the hash value RDH of the record datum RD with the identification number IN of 13 is stored in the leaf node LN numbered 13. In some embodiments, different identification data ID may generate the same identification number IN, or different recording data RD may have the same identification data ID and generate the same identification number IN. In this case, the hash values RDH of the plurality of record data RD may correspond to the same identification number IN and be stored in the same leaf node LN. In some embodiments, each leaf node LN of the binary tree BT can store the hash values RDH of two or more record data RD, and the hash values RDH of the two or more record data RD corresponding to a certain leaf node LN are connected and then hashed to generate a hash value. The hash value corresponding to the two or more record data RD are stored in the leaf node LN.

As shown in FIG. 3, in this embodiment, the location search unit 140 of the security protocol device 100 can locate the hash values RDH of the record data RD by using the identification numbers IN. When a user needs to search or verify a hash value RDH corresponding to a certain record datum RD in a certain binary tree BT in the database device 200, the user can perform the above task by using the security protocol device 100. In this case, the location search unit 140 of the security protocol device 100 locates the hash value RDH of the record datum RD (i.e. the stored leaf node LN) by an identification number IN, and extracts the hash value RDH of the record datum RD directly from the leaf node LN of the binary tree BT corresponding to the identification number IN, so as to quickly locate and search for data. Moreover, to verify that a certain record datum RD does not exist, it can also be completed by using the identification number IN. The security protocol device 100 does not need to obtain all the hash values in the complete binary tree BT. The location search unit 140 of the security protocol device 100 can locate the hash value RDH of the record datum RD, i.e. the corresponding leaf node LN, by using an identification number IN corresponding to the record datum RD, and can directly confirm whether the hash value RDH of the record datum RD exists in the leaf node LN. If the leaf node LN does not have the hash value RDH of the record datum RD, it can be verified that the record datum RD does not exist. In this way, the network transmission requirements, operation amount, operation time, and operation costs of the entire verification task can be greatly reduced.

As mentioned above, in some embodiments, the identification data ID of different record data RD may generate the same identification number IN. In this case, a hash value RDH of a certain record datum RD may be located to two or more leaf nodes LN. If the record data RD needs to be verified, the security protocol device 100 can acquire and verify the hash values RDH in the two or more leaf nodes LN from the database device 200. In this embodiment, the probability of repeated identification numbers IN is relatively low. Even if a hash value RDH of a certain record datum RD is located to two or more leaf nodes LN, the number of the located leaf nodes LN is still less or far less than the number of all leaf nodes LN. The network transmission requirements, operation amount, operation time, and operation costs of the entire verification task still can be greatly reduced.

As shown in FIG. 3, in this embodiment, the terminal device 400 further includes an identification number unit 440. The identification number unit 440 of the terminal device 400 has the same function as the identification number unit 130 of the security protocol device 100. The identification number unit 440 also can generate identification numbers IN according to identification data ID of record data RD. The terminal device 400 can verify whether the security protocol device 100 acquires data from the correct leaf node LN by using the identification number unit 440. For example, if the terminal device 400 needs to verify a certain record datum RD, and identification data ID of the record data RD is "E1534391" (refer to the foregoing example), when the terminal device 400 transmits the verification request to the security protocol device 100, the location search unit 140 of the security protocol device 100 can locate a hash value RDH of the record datum RD by using an identification number IN corresponding to the record datum RD, finds that it is located in the leaf node LN numbered 13 of the binary tree BT in the database device 200, and returns the hash value RDH in the leaf node LN numbered 13 to the terminal device 400 for the terminal device 400 to perform verification. Similarly, the identification number unit 440 of the terminal device 400 also can generate an identification number IN according to the identification data ID "E1534391" of the record datum RD, and obtain that the hash value RDH of the record datum RD should be stored in the leaf node LN numbered 13 based on the identification number IN. Therefore, the terminal device 400 can confirm whether the hash value RDH of the record datum RD returned by the security protocol device 100 comes from the correct location (i.e. the leaf node LN numbered 13).

Figure 4:
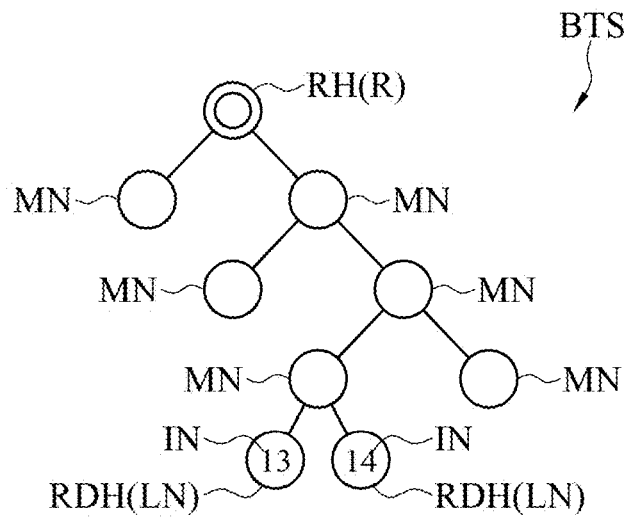
FIG. 4 is a schematic diagram of a slice of a binary tree according to an embodiment of the present invention.

Referring to FIG. 4, FIG. 4 is a schematic diagram of a slice BTS of a binary tree BT according to an embodiment of the present invention. As shown in FIG. 3 and FIG. 4, in this embodiment, when the security protocol device 100 transmits the root hash RH of the binary tree BT to the blockchain device 300, the slicing unit 150 of the security protocol device 100 automatically cuts the binary tree BT into a plurality of slices BTS and returns the slices BTS to the corresponding terminal devices 400, and the slice verification unit 430 of each terminal device 400 verifies the correctness of each slice BTS received. As shown in FIG. 2 and FIG. 4, in this embodiment, each slice BTS is Merkle proof formed by a root R, two corresponding leaf nodes LN, and necessary middle nodes MN of the binary tree BT. The hash values RDH of the record data RD stored in the set of leaf nodes LN can be obtained through the foregoing operation process to obtain the root hash RH located at the root R. A root hash RH of the slice BTS should be consistent with the root hash RH of the complete binary tree BT. For example, after a certain terminal device 400 transmits a certain record datum RD and identification data ID to the security protocol device 100, the security protocol device 100 stores a hash value RDH of the record datum RD in a certain leaf node LN of a certain binary tree BT and returns a slice BTS corresponding to the leaf node LN to the terminal device 400. The terminal device 400 compares whether the hash value RDH of the record datum RD in the leaf node LN of the slice BTS is consistent with the original hash values RDH of the original record data RD generated by the terminal device 400. If they are consistent, it indicates that the verification is correct. If they are inconsistent, it indicates that the verification is incorrect. If the verification is incorrect, the corresponding terminal device 400 can transmit a protest message to the blockchain device 300 for subsequent data correction or invalidation or other procedures.

In this embodiment, each terminal device 400 includes a blockchain chip. The blockchain chip is, for example but not limited to, an integrated circuit (IC) that can automatically transmit signals between the blockchain BC and the verification systems 10 and 10b. With the blockchain chip, the terminal device 400 can be designed to be lighter, thinner, and shorter, and the terminal device 400 can be more easily placed on any object or integrated into any electronic device. For example, the terminal device 400 can be set or integrated into a battery (such as a large battery pack for electric or hybrid buses or automobiles), an electric meter, an automobile headlight, an automobile body (such as a driving computer of an automobile networked through 5G), or a frame. The terminal device 400 automatically and continuously uploads the record data RD of each object. The record data RD are, for example but not limited to, hourly or daily (depending on the scheduled upload interval) historical use of the battery, the electric meter or the automobile headlight, or hourly or daily historical sensing data of sensor information (such as the engine, the odometer, the number of starts, etc.) of the automobile body, or the historical sensing data of the hourly or daily temperature and humidity changes sensed by the sensor on the frame, and the original data of the painter, etc. The security protocol device 100 can store the hash values RDH of the record data RD to the database device 200 via the off-chain framework OC, and upload the root hash RH to the blockchain device 300.

Based on the verification systems 10, 10a, in addition to rapid locating and searching of various data by the database device 200 via the off-chain framework OC, the non-repudiation of the data can also be achieved by verification of the blockchain BC. Moreover, based on the collocation application of the terminal device 400, the situation of the object can be guaranteed, and the value of the object can be improved. For example, used large battery packs used in long-haul vehicles can be transferred to short-haul vehicles after use to a certain degree, while the used large battery packs used in short-haul vehicles can be transferred to places such as fishing farms as backup power generation batteries after use to a certain degree. Each conversion can be performed through a platform such as a trading platform for used objects. The situation of the object can be verified by the verification systems 10, 10a in each transaction, thereby improving the reliability of the object quality and the value of the object.

Figure 5:
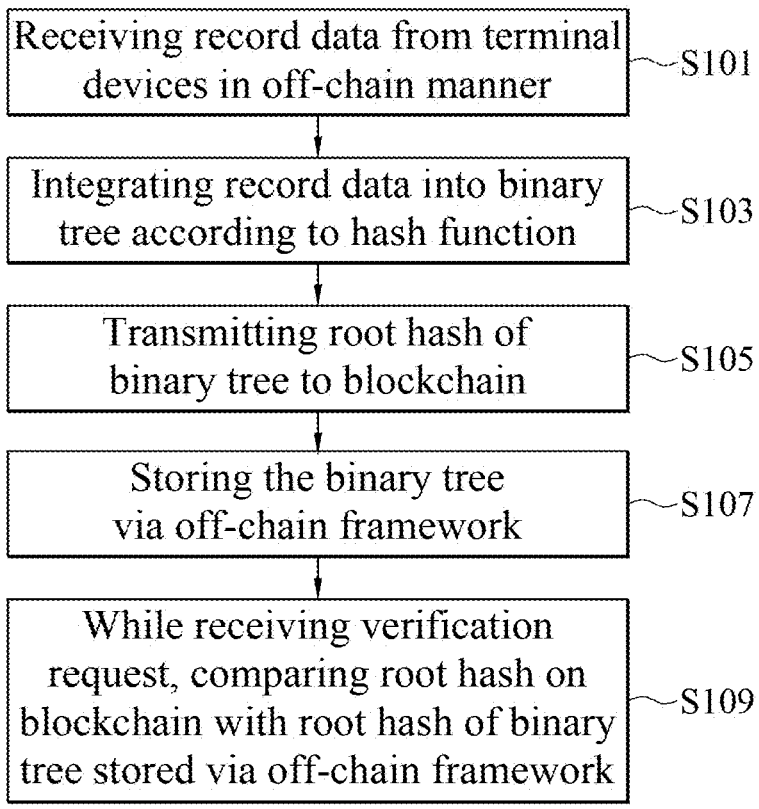
FIG. 5 is a flowchart of a verification method according to an embodiment of the present invention.

Referring to FIG. 5, FIG. 5 is a flowchart of a verification method according to an embodiment of the present invention. In the embodiment, the verification method can be practiced via the verification system 10 shown in FIG. 1, but is not limited thereto. The verification method is suitable for cooperating with a blockchain BC. In step S101, the security protocol device 100 receives a plurality of record data RD from a plurality of terminal devices 400 in an off-chain manner, e.g. via an off-chain framework OC consisted of, for example, one or more off-chain devices and/or one or more off-chain channels not involved in the blockchain BC. In step S103, the security protocol device 100 integrates the record data RD into at least one binary tree BT according to a hash function, and the hash values RDH of the record data RD are respectively stored in the leaf nodes LN of the binary tree BT. In step S105, the security protocol device 100 transmits a root hash RH of the binary tree BT to the blockchain BC, and the blockchain device 300 stores the root hashes RH. In step S107, the security protocol device 100 stores the binary tree BT via the off-chain framework OC, that is, the security protocol device 100 stores the complete binary tree BT in the database device 200 via the off-chain framework OC. In step S109, when the security protocol device 100 receives a verification request, the security protocol device 100 compares the root hash RH in the blockchain device 300 located on the blockchain BC with the root hash RH of the binary tree BT stored in the database device 200 via the off-chain framework OC, so as to verify the correctness of the binary tree BT stored via the off-chain framework OC.

Figure 6:
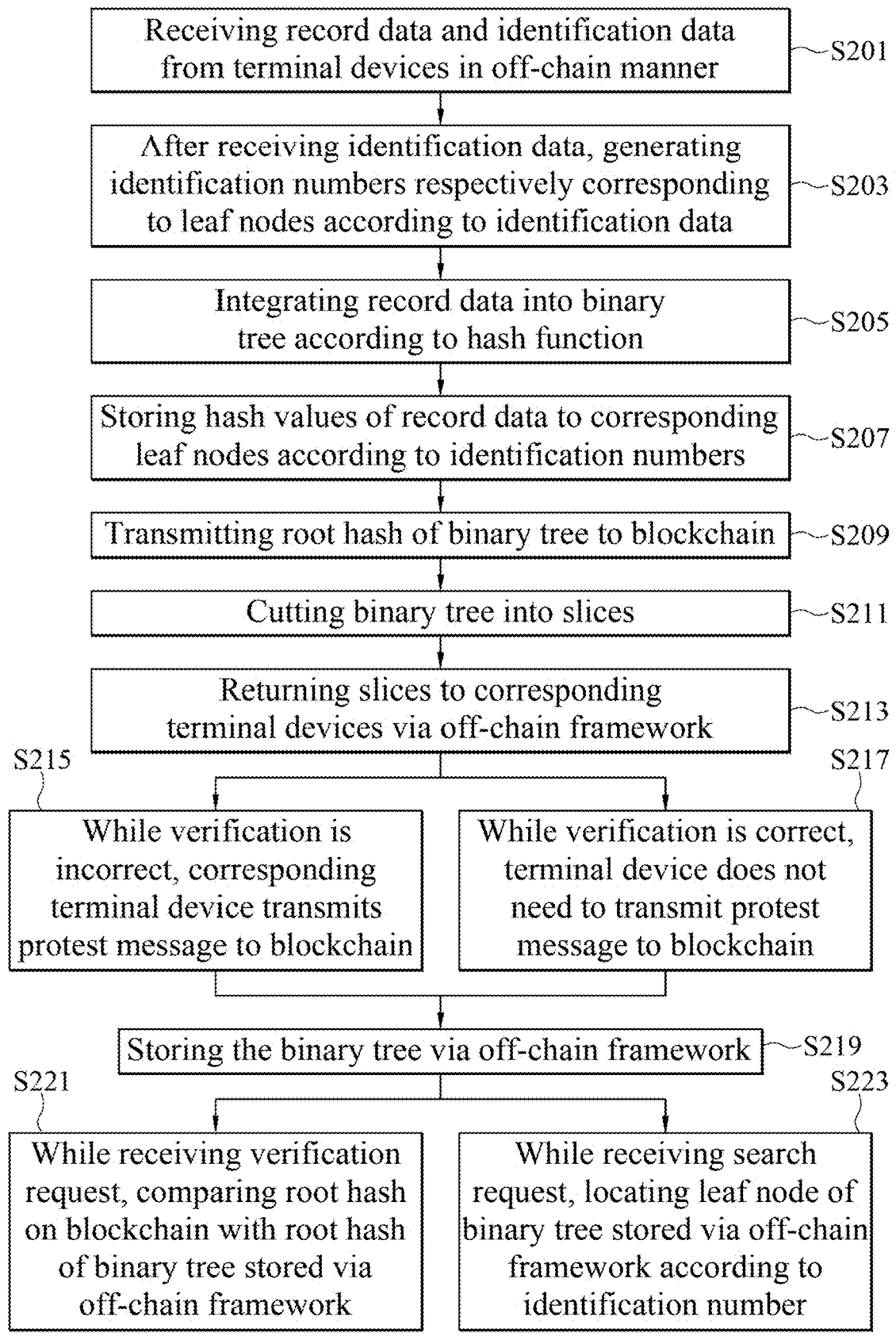
FIG. 6 is a flowchart of a verification method according to another embodiment of the present invention.

Referring to FIG. 6, FIG. 6 is a flowchart of a verification method according to another embodiment of the present invention. In this embodiment, the verification method can be implemented by the verification systems 10a shown in FIG. 3, but is not limited thereto. In step S201, the security protocol device 100 receives a plurality of record data RD and a plurality of identification data ID from a plurality of terminal devices 400 in an off-chain manner, e.g. via an off-chain framework OC consisted of, for example, one or more off-chain devices and/or one or more off-chain channels not involved in the blockchain BC, and the identification data ID respectively correspond to the record data RD. In step S203, after the security protocol device 100 receives the identification data ID, the security protocol device 100 generates a plurality of identification numbers IN respectively corresponding to leaf nodes LN according to the identification data ID, and each leaf node LN of the binary tree BT corresponds to a unique identification number IN. For example, the security protocol device 100 extracts a plurality of predetermined bits from the hash value of each identification datum ID to generate each identification number IN. If the binary tree BT has a height value H, the predetermined bits are the first H−1 bits of the hash value of each identification datum ID. In step S205, the security protocol device 100 integrates the record data RD into at least one binary tree BT according to a hash function. In step S207, the security protocol device 100 stores the hash values RDH of the record data RD to the corresponding leaf nodes LN according to the identification numbers IN. In step S209, the security protocol device 100 transmits a root hash RH of the binary tree BT to a blockchain BC, and the blockchain device 300 stores the root hashes RH. In step S211, the security protocol device 100 cuts the binary tree BT into a plurality of slices BTS. In step S213, the security protocol device 100 returns the slices BTS to the corresponding terminal devices 400 via the off-chain framework OC. Next, each terminal device 400 verifies the correctness of each slice BTS received. In step S215, when the slice BTS is verified to be incorrect, the corresponding terminal device 400 transmits a protest message to the blockchain BC. In step S217, when the slice BTS is verified to be correct, the terminal device 400 does not need to transmit a protest message to the blockchain BC. In step S219, the security protocol device 100 stores the binary tree BT via the off-chain framework OC, that is, the security protocol device 100 stores the complete binary tree BT in the database device 200.

In step S221, when the security protocol device 100 receives a verification request, the security protocol device 100 compares the root hash RH in the blockchain device 300 located on the blockchain BC with the root hash RH of the binary tree BT stored in the database device 200 via the off-chain framework OC, so as to verify the correctness of the binary tree BT stored via the off-chain framework OC. In step S223, when the security protocol device 100 receives a search request, and the search request is directed at a certain record datum RD, the security protocol device 100 locates the leaf node LN of the binary tree BT stored via the off-chain framework OC according to an identification number IN corresponding to the record datum RD, so as to search the leaf node LN corresponding to the identification number IN and acquire a hash value RDH of the record datum RD from the leaf node LN, or verify that a hash value RDH of the record datum RD does not exist in the leaf node LN.

In summary, the conventional blockchain architecture transfers all data to the blockchain and then verifies the data through blockchain miners, which will consume a large number of blockchain operation resources. According to the verification system and method of the embodiments of the present invention, under the premise of maintaining the credibility (non-repudiation) of the data, most of the data can be set in an off-chain database device, and the correctness of the binary tree can be verified by comparing the root hash of the binary tree of the off-chain database device with the corresponding root hash of the blockchain by the security protocol device. Therefore, the main operations are converted to be performed at the off chain, greatly reducing the loads on the blockchain. In addition, the security protocol device can locate the record data according to the identification number, thereby quickly searching for the leaf nodes in which the hash values of the record data in the database device are stored, and quickly verifying whether the record data exist or not. By means of the verification system and method of the embodiments of the present invention, the network transmission requirement, the total operation amount, operation time, and operation costs of the system can be reduced. Moreover, the terminal device with the blockchain chip can be set or integrated into various objects, which is more simple and convenient in practical application, and can improve the reliability of the object quality and the value of the object.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:

1. A security protocol device of cooperating with a blockchain and off-chain device for data verification, comprising:
   a binary tree processing unit, configured to:
   receive record data from a plurality of terminal devices;
   integrate the record data into one or more binary trees according to a hash function, wherein one of the one or more binary trees comprises a root and a plurality of leaf nodes, the root stores a root hash, and hash values of the record data are respectively stored in the leaf nodes and wherein a binary tree is a particular one of the one or more binary trees;
   store the binary tree and a plurality of binary tree slices, partitioned from the binary tree, to a database device; and
   transmit the root hash of the binary tree to a blockchain device;
   wherein the security protocol device communicates with the plurality of terminal devices and the database device in an off-chain manner, wherein the security protocol device transmits each of the plurality of the plurality of binary tree slices to a respective one of the plurality of terminal device according to the received data record; and
   a verification unit, configured to receive a verification request from one of the plurality of terminal devices and compare the root hash from the blockchain device with the root hash of the binary tree stored in the database device to verify the correctness of the binary tree stored in the database device stored in the off-chain manner.

2. The security protocol device according to claim 1, wherein the binary tree processing unit is configured to receive identification data corresponding to the record data, and store the hash value of each of the record data to the corresponding one of the leaf nodes according to the respective identification data.

3. The security protocol device according to claim 2, further comprising an identification number unit, wherein when the binary tree processing unit receives the identification data, the identification number unit generates a plurality of identification numbers respectively corresponding to the leaf nodes according to the identification data, and the binary tree processing unit stores the hash value of each of the record data to the corresponding one of the leaf nodes according to the respective identification number.

4. The security protocol device according to claim 3, wherein the identification number unit extracts a plurality of predetermined bits from the hash value of the respective identification data to generate the respective identification number.

5. The security protocol device according to claim 4, wherein while the binary tree has a height value H, the predetermined bits are first H-1 bits of the hash values of the respective identification data.

6. The security protocol device according to claim 2, wherein the identification data is a plain code.

7. The security protocol device according to claim 1, wherein when the binary tree processing unit transmits the root hash of the binary tree to the blockchain device, the binary tree processing unit cuts the binary tree into a plurality of slices and returns each of the slices to the corresponding one of the terminal devices.

8. A verification method of cooperating with a blockchain and off-chain device for data verification, comprising:
receiving a plurality of record data from a plurality of terminal devices;
integrating the record data into one or more binary trees according to a hash function, wherein one of the one or more binary trees comprises a root and a plurality of leaf nodes, the root stores a root hash, and hash values of the record data are respectively stored in the leaf nodes and wherein a binary tree is a particular one of the one or more binary trees;
transmitting the root hash of the binary tree to the blockchain;
storing the binary tree and a plurality of binary tree slices, partitioned from the binary tree in an off-chain manner, and wherein a security protocol device communicates with the plurality of terminal devices and a database device and transmits each of the plurality of binary tree slices to a respective one of the plurality of terminal device according to the received data record; and
while receiving a verification request from one of the plurality of terminal devices, comparing the root hash from the blockchain with the root hash of the binary tree stored in the off-chain manner to verify the correctness of the binary tree stored in the off-chain manner.

9. The verification method according to claim 8, further comprising:
receiving a plurality of identification data in the off-chain manner, wherein each of the identification data corresponds to each of the record data; and
storing the hash value of each of the record data to a corresponding one of the leaf nodes according to each of the identification data.

10. The verification method according to claim 9, further comprising: after receiving the identification data, generating a plurality of identification numbers respectively corresponding to the leaf nodes according to the identification data, and storing the hash values of the record data to the corresponding leaf nodes according to the identification numbers.

11. The verification method according to claim 10, wherein the step of generating the identification numbers respectively corresponding to the leaf nodes according to the identification data comprises: extracting a plurality of predetermined bits from the hash value of the respective identification data to generate the respective identification number.

12. The verification method according to claim 11, wherein while the binary tree has a height value H, the predetermined bits are first H-1 bits of the hash values of the respective identification data.

13. The verification method according to claim 9, wherein the identification data is a plain code.

14. The verification method according to claim 8, wherein the step of transmitting the root hash of the binary tree to the blockchain comprises:
cutting the binary tree into a plurality of slices; and
returning each of the slices to the corresponding one of the terminal devices in the off-chain manner.

15. A terminal device of cooperating with a security protocol and blockchain device for data verification, comprising:
a record data generating unit, configured to generate record data, and transmit the record data to the security protocol device, wherein the security protocol device communicates with the terminal device and a database device in an off-chain manner;
an identification data generating unit, configured to generate identification data corresponding to the record data, and transmit the identification data to the security protocol device;
a slice verification unit, configured to;
receive a binary tree slice from the security protocol device, wherein the binary tree slice is corresponding to the generated record data of the terminal device, wherein the binary tree slice comprises a root and a plurality of leaf nodes, wherein a hash value of the record data (RDH) is stored at a particular leaf node corresponding to the generated identification data of the terminal device and a root hash, generated by the RDH, is stored at the root of the binary tree slice; and
verify, cooperated with the security protocol device, a correctness of the binary tree slice by comparing the root hash stored at the blockchain device with the root hash of the binary tree stored at the database device.

16. The terminal device according to claim 15, wherein the slice verification unit is configured to transmit a protest message to a blockchain device when the binary tree slice is verified to be incorrect.

17. The terminal device according to claim 15, wherein the identification data is a plain code.

18. The terminal device according to claim 15, further comprising a blockchain chip.

19. A method performed by a terminal device to cooperate with a security protocol and blockchain device for data verification, comprising:
generating record data by the terminal device;
generating identification data corresponding to the record data of the terminal device,
transmitting the record data and the identification data to the security protocol device, wherein the security protocol device communicates with the terminal device and a database device in an off-chain manner;
receiving a binary tree slice from the security protocol device, wherein the binary tree slice is corresponding to the generated record data of the terminal device, wherein the binary tree slice comprises a root and a plurality of leaf nodes, wherein a hash value of the record data (RDH) is stored at a particular leaf node corresponding to the generated identification data of the terminal device and a root hash, generated by the RDH, is stored at the root of the binary tree slice; and verifying, cooperated with the security protocol device, a correctness of the binary tree slice by comparing the root hash stored at the blockchain device with the root hash of the binary tree stored at the database device.

20. The method according to claim 19, further comprising: transmitting a protest message to a blockchain device when the binary tree slice is verified to be incorrect.

21. The method according to claim 19, wherein the identification data is a plain code.

* * * * *